United States Patent
Nomaru et al.

(10) Patent No.: US 7,499,185 B2
(45) Date of Patent: Mar. 3, 2009

(54) MEASURING DEVICE FOR WORKPIECE HELD ON CHUCK TABLE

(75) Inventors: Keiji Nomaru, Ota-ku (JP); Taiki Sawabe, Ota-ku (JP)

(73) Assignee: Disco Corporation, Tokyo (JP)

(*) Notice: Subject to any disclaimer, the term of this patent is extended or adjusted under 35 U.S.C. 154(b) by 0 days.

(21) Appl. No.: 12/028,470

(22) Filed: Feb. 8, 2008

(65) Prior Publication Data
US 2008/0204748 A1 Aug. 28, 2008

(30) Foreign Application Priority Data
Feb. 27, 2007 (JP) .............................. 2007-047395

(51) Int. Cl.
*G01B 11/24* (2006.01)
*G01B 11/14* (2006.01)

(52) U.S. Cl. ...................................... 356/614; 356/630

(58) Field of Classification Search ... 356/237.1–241.6, 356/426–431, 600–640
See application file for complete search history.

(56) References Cited

U.S. PATENT DOCUMENTS

| 4,340,306 A | * | 7/1982 | Balasubramanian | ........ 356/513 |
| 5,748,318 A | * | 5/1998 | Maris et al. | ................. 356/630 |
| 2005/0122529 A1 | * | 6/2005 | Kim et al. | .................... 356/503 |

FOREIGN PATENT DOCUMENTS

| JP | A 10-305420 | 11/1998 |
| JP | B2 3408805 | 7/2002 |

* cited by examiner

*Primary Examiner*—L. G Lauchman
*Assistant Examiner*—Jarreas C Underwood
(74) *Attorney, Agent, or Firm*—Greer, Burns & Crain Ltd

(57) ABSTRACT

A measuring device for measuring the height of a workpiece held on a chuck table provided in a processing machine. The measuring device includes a white light source for emitting white light, an acousto-optic deflecting unit for separating the white light emitted from the white light source to produce a flux of diffracted light and for swinging the flux of the diffracted light over a predetermined angular range by applying a voltage, a pinhole mask for passing light having a part of the wavelengths of the diffracted light produced by the acousto-optic deflecting unit, and a chromatic aberration lens for focusing the light passed through the pinhole mask and for applying the focused light to the workpiece held on the chuck table.

5 Claims, 14 Drawing Sheets

MEASURING DEVICE FOR WORKPIECE HELD ON CHUCK TABLE

BACKGROUND OF THE INVENTION

1. Field of the Invention

The present invention relates to a measuring device for measuring the height or thickness of a workpiece such as a semiconductor wafer held on a chuck table included in a processing machine such as a laser processing machine.

2. Description of the Related Art

In a semiconductor device fabrication process, the upper surface of a substantially disk-shaped semiconductor wafer is formed with a plurality of crossing separation lines called streets to thereby define a plurality of partitioned regions arranged like a matrix, and a plurality of devices such as ICs and LSIs are formed in these partitioned regions. The semiconductor wafer is cut along these streets to separate the partitioned regions, thus fabricating individual semiconductor chips.

As a method of cutting such a semiconductor wafer or optical device wafer along the streets, a laser processing method is known. In the laser processing method, a pulsed laser beam that can pass through the wafer is used. The pulsed laser beam is applied to the wafer so as to be focused on the region to be cut inside the wafer. More specifically, a pulsed laser beam having a wavelength of 1064 nm, for example, is applied to the wafer from one side thereof so as to be focused inside of the wafer along each street, thereby continuously forming an altered layer inside the wafer along each street. By forming the altered layer inside the wafer along each street, the strength of the wafer is lowered along each street. Accordingly, by applying an external force to the wafer along each street, the wafer is cut along each street (see Japanese Patent No. 3408805, for example).

As another method of cutting a platelike workpiece such as a semiconductor wafer, a method of forming a laser processed groove is known. In this method, a pulsed laser beam is applied to the workpiece along each street to thereby form a laser processed groove along each street. The workpiece is cut (broken) along each laser processed groove by using a mechanical breaking device (see Japanese Patent Laid-open No. Hei 10-305420, for example). Also in such a case of forming the laser processed groove on the workpiece along each street, it is important to locate the focal point of the laser beam at a predetermined height in the workpiece.

As a method of forming a via hole at a position where an electrode called a bonding pad is formed on the upper surface of a semiconductor wafer, it is known that a pulsed laser beam is applied to the lower surface of the semiconductor wafer so as to form the via hole reaching the bonding pad. If there are variations in the thickness of the semiconductor wafer, the via hole reaching the bonding pad cannot be accurately formed. It is accordingly necessary to accurately grasp the thickness of the semiconductor wafer at the position where the bonding pad is formed.

However, a platelike workpiece such as a semiconductor wafer has undulations, causing variations in thickness. As a result, it is difficult to perform uniform laser processing. In the case of forming an altered layer in the wafer along each street, variations in the thickness of the wafer cause a problem such that the altered layer cannot be uniformly formed at a predetermined depth in the wafer in relation to a refractive index in applying a laser beam to the wafer. Also in the case of forming a laser processed groove on the wafer along each street, variations in the thickness of the wafer cause a problem such that the laser processed groove cannot be formed with a uniform depth. Further, in the case of forming a via hole reaching the bonding pad formed on the wafer, variations in the thickness of the wafer cause a problem such that the via hole reaching the bonding pad cannot be accurately formed.

SUMMARY OF THE INVENTION

It is therefore an object of the present invention to provide a measuring device which can accurately measure the height or thickness of a workpiece such as a semiconductor wafer held on a chuck table.

In accordance with an aspect of the present invention, there is provided a measuring device for measuring the height of a workpiece held on a chuck table included in a processing machine, the measuring device including: a white light source for emitting white light; acousto-optic deflecting means for separating the white light emitted from the white light source to produce a flux of diffracted light and for swinging the flux of the diffracted light over a predetermined angular range by applying a voltage; a first pinhole mask configured to pass light having a part of the wavelengths of the diffracted light produced by the acousto-optic deflecting means; a chromatic aberration lens configured to focus the light passed through the first pinhole mask and to apply the focused light to the workpiece held on the chuck table; a beam splitter interposed between the first pinhole mask and the chromatic aberration lens configured to deflect the light reflected from the workpiece; a second pinhole mask configured to pass the reflected light deflected by the beam splitter; a photodetector configured to detect the reflected light passed through the second pinhole mask and to output a photodetection signal corresponding to the intensity of the reflected light detected; and control means for outputting a control signal to the acousto-optic deflecting means and for obtaining the height of the workpiece held on the chuck table according to the photodetection signal input from the photodetector. In the measuring device, the control means includes a memory configured to store a first control map setting the relation between the voltage applied to the acousto-optic deflecting means and the wavelength of light passing through the first pinhole mask and a second control map setting the relation between the wavelength of light focused by the chromatic aberration lens and the focal length of the chromatic aberration lens, a value for the voltage applied to the acousto-optic deflecting means corresponding to a peak value for the light intensity detected by the photodetector is obtained by the control means, the above-obtained voltage value is applied to the first control map to thereby obtain the wavelength of light passing through the first pinhole mask, and the above-obtained wavelength of light passing through the first pinhole mask is applied to the second control map to thereby measure the height of the workpiece held on the chuck table.

Preferably, the measuring device further includes an aberration correcting lens interposed between the acousto-optic deflecting means and the first pinhole mask configured to correct the aberration of the diffracted light produced by the acousto-optic deflecting means. Further, the measuring device further includes a first focusing lens provided upstream of the second pinhole mask in the direction of propagation of the reflected light deflected by the beam splitter; and a second focusing lens provided downstream of the second pinhole mask in the direction of propagation of the reflected light deflected by the beam splitter, wherein the focal position of the first focusing lens is set at the pinhole of the second pinhole mask.

Preferably, the measuring device further includes: X-direction moving means for relatively moving the chromatic aberration lens and the chuck table in an X direction; Y-direction moving means for relatively moving the chromatic aberration lens and the chuck table in a Y direction perpendicular to the X-direction; X-directional position detecting means for detecting the position of the chuck table in the X direction; and Y-directional position detecting means for detecting the position of the chuck table in the Y direction. In the measuring device, the control means obtains the height of the workpiece at a predetermined position according to detection signals from the X-directional position detecting means and the Y-directional position detecting means, including the memory storing the above-obtained height of the workpiece at the predetermined position.

In accordance with another aspect of the present invention, there is provided a laser processing machine including a chuck table having a holding surface for holding a workpiece; processing laser beam applying means for applying a processing laser beam to the workpiece held on the chuck table; focal position adjusting means for moving the processing laser beam applying means in a direction perpendicular to the holding surface of the chuck table; and the above-mentioned measuring device. In the laser processing machine, the measuring device measures the height of the workpiece held on the chuck table.

According to the present invention, the focal length of the chromatic aberration lens varies according to the wavelength of the incident white light. By using this feature, a specific wavelength is determined according to the intensity of the reflected light from the workpiece, thereby obtaining a specific focal length corresponding to this specific wavelength. Accordingly, the height of the workpiece held on the chuck table can be accurately measured.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
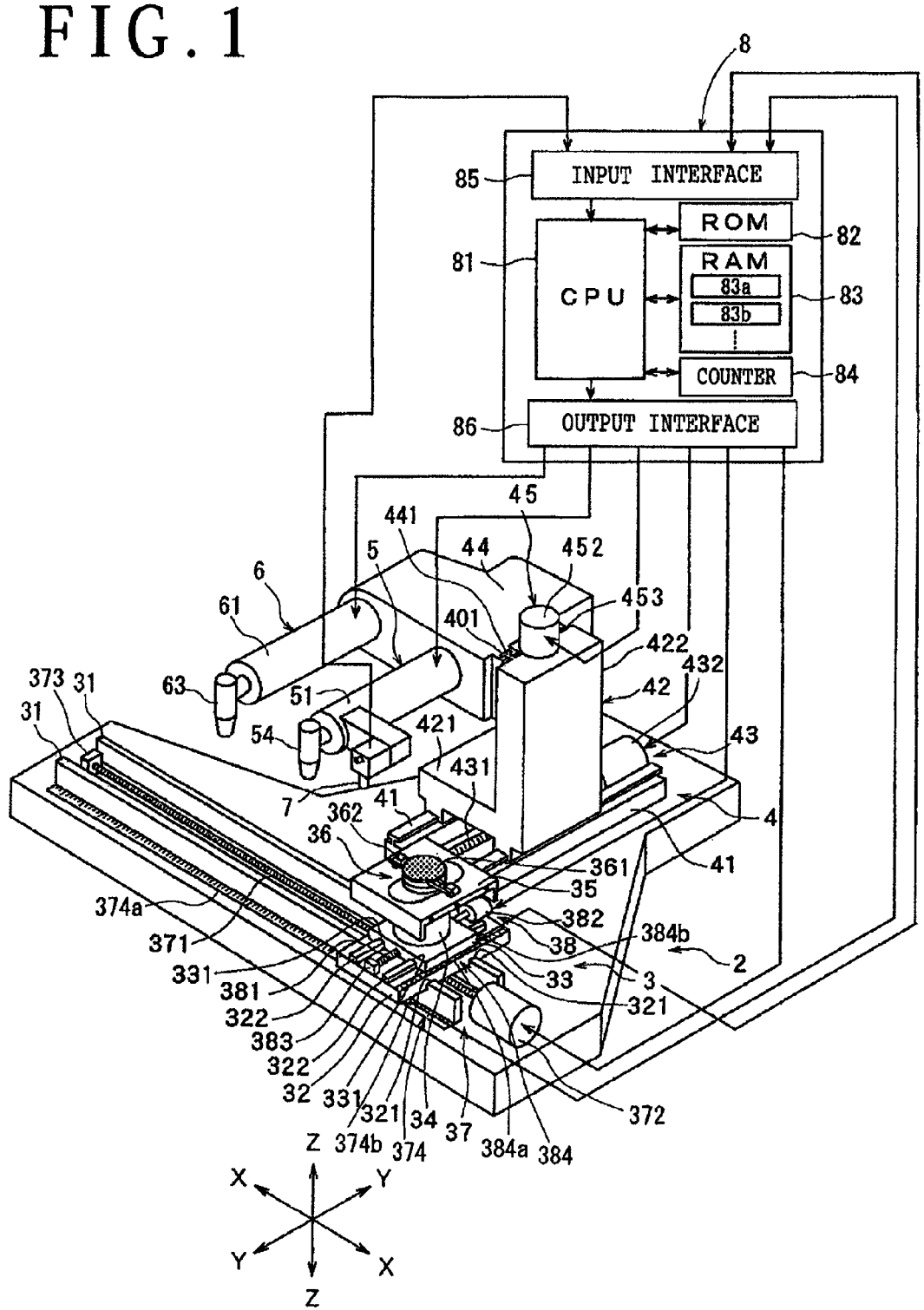
FIG. 1 is a perspective view of a laser processing machine according to a preferred embodiment of the present invention.

There will now be described a preferred embodiment of the measuring device and the laser processing machine according to the present invention with reference to the attached drawings. FIG. 1 is a perspective view of a laser processing machine including a measuring device for measuring the height of a workpiece held on a chuck table according to a preferred embodiment of the present invention. The laser processing machine shown in FIG. 1 includes a stationary base 2, a chuck table mechanism 3 for holding a workpiece, the chuck table mechanism 3 being provided on the stationary base 2 so as to be movable in a work feed direction (X direction) shown by an arrow X, a laser beam applying unit supporting mechanism 4 provided on the stationary base 2 so as to be movable in an index direction (Y direction) shown by an arrow Y perpendicular to the work feed direction (X direction) shown by the arrow X mentioned above, a processing laser beam applying unit 5 provided on the laser beam applying unit supporting mechanism 4 so as to be movable in a direction (Z direction) shown by an arrow Z, and a measuring light beam applying unit 6 constituting the measuring device for measuring the height of the workpiece held on the chuck table. The processing laser beam applying unit 5 and the measuring light beam applying unit 6 are mounted on a common unit holder 44.

The chuck table mechanism 3 includes a pair of guide rails 31 provided on the stationary base 2 so as to extend parallel to each other in the work feed direction (X direction) shown by the arrow X, a first sliding block 32 slidably provided on the guide rails 31 so as to be movable in the work feed direction (X direction) shown by the arrow X, a second sliding block 33 slidably provided on the first sliding block 32 so as to be movable in the index direction (Y direction) shown by the arrow Y, a cover table 35 supported through a cylindrical member 34 on the second sliding block 33, and a chuck table 36 as workpiece holding means. The chuck table 36 has a vacuum chuck 361 formed of a porous material. A semiconductor wafer as a workpiece is held on the vacuum chuck 361 (holding surface) by suction means (not shown). The chuck table 36 is rotatable by a pulse motor (not shown) provided in the cylindrical member 34. The chuck table 36 further has a clamp 362 for fixing an annular frame (not shown).

A pair of guided grooves 321 slidably fitted with the pair of guide rails 31 mentioned above are formed on the lower surface of the first sliding block 32, and a pair of guide rails 322 are provided on the upper surface of the first sliding block 32 so as to extend parallel to each other in the index direction (Y direction) shown by the arrow Y. Accordingly, the first sliding block 32 is movable in the work feed direction (X direction) shown by the arrow X along the guide rails 31 by the slidable fit of the guided grooves 321 with the guide rails 31. The chuck table mechanism 3 further includes work feeding means 37 (X-direction moving means) for moving the first sliding block 32 in the work feed direction (X direction) shown by the arrow X along the guide rails 31.

The work feeding means 37 includes an externally threaded rod 371 extending parallel to the guide rails 31 so as to be interposed therebetween and a pulse motor 371 as a drive source for rotationally driving the externally threaded rod 371. The externally threaded rod 371 is rotatably supported at one end thereof to a bearing block 373 fixed to the stationary base 2 and connected at the other end to the output shaft of the pulse motor 372 so as to receive the torque thereof. The externally threaded rod 371 is engaged with a tapped through hole formed in an internally threaded block (not shown) projecting from the lower surface of the first sliding block 32 at a central portion thereof. Accordingly, the first sliding block 32 is moved in the work feed direction (X direction) shown by the arrow X along the guide rails 31 by driving the pulse motor 372 to normally or reversely rotate the externally threaded rod 371.

The laser processing machine shown in FIG. 1 further includes work feed amount detecting means 374 for detecting the amount of work feed of the chuck table 36. The work feed amount detecting means 374 includes a linear scale 374a extending along one of the guide rails 31 and a reading head 374b provided on the first sliding block 32 so as to be moved therewith along the linear scale 374a. The reading head 374b of the work feed amount detecting means 374 transmits a pulse signal to control means 8 at a rate of one pulse per micrometer. The control means 8 counts the number of pulses of the pulse signal input from the reading head 374b to thereby detect the amount of work feed of the chuck table 36. Accordingly, the work feed amount detecting means 374 functions as X-directional position detecting means for detecting the position of the chuck table 36 in the X direction.

In the case of using the pulse motor 372 as the drive source for the work feeding means 37 as in this preferred embodiment, the number of drive pulses of a drive signal output from the control means 8 to the pulse motor 372 may be counted to thereby detect the amount of work feed of the chuck table 36. As a modification, in the case of using a servo motor as the drive source for the work feeding means 37, a rotary encoder for detecting the rotational speed of the servo motor may be provided. In this case, the pulse signal output from the rotary encoder is transmitted to the control means 8, and the number of pulses of the pulse signal input into the control means 8 is counted to thereby detect the amount of work feed of the chuck table 36.

A pair of guided grooves 331 slidably fitted with the pair of guide rails 322 provided on the upper surface of the first sliding block 32 are formed on the lower surface of the second sliding block 33. Accordingly, the second sliding block 33 is movable in the index direction (Y direction) shown by the arrow Y by the slidable fit of the guided grooves 331 with the guide rails 322. The chuck table mechanism 3 further includes first index feeding means 38 (Y-direction moving means) for moving the second sliding block 33 in the index direction (Y direction) shown by the arrow Y along the guide rails 322 of the first sliding block 32. The first index feeding means 38 includes an externally threaded rod 381 extending parallel to the guide rails 322 so as to be interposed therebetween and a pulse motor 382 as a drive source for rotationally driving the externally threaded rod 381.

The externally threaded rod 381 is rotatably supported at one end thereof to a bearing block 383 fixed to the upper surface of the first sliding block 32 and connected at the other end to the output shaft of the pulse motor 382 so as to receive the torque thereof. The externally threaded rod 381 is engaged with a tapped through hole formed in an internally threaded block (not shown) projecting from the lower surface of the second sliding block 33 at a central portion thereof. Accordingly, the second sliding block 33 is moved in the index direction (Y direction) shown by the arrow Y along the guide rails 322 by driving the pulse motor 382 to normally or reversely rotate the externally threaded rod 381.

The laser processing machine shown in FIG. 1 further includes index feed amount detecting means 384 for detecting the amount of index feed of the second sliding block 33. The index feed amount detecting means 384 includes a linear scale 384a extending along one of the guide rails 322 and a reading head 384b provided on the second sliding block 33 so as to be moved therewith along the linear scale 384a. In this embodiment, the reading head 384b of the index feed amount detecting means 384 transmits a pulse signal to the control means 8 at a rate of one pulse per micrometer. The control means 8 counts the number of pulses of the pulse signal input from the reading head 384b to thereby detect the amount of index feed of the chuck table 36. Accordingly, the index feed amount detecting means 384 functions as Y-directional position detecting means for detecting the position of the chuck table 36 in the Y direction.

In the case of using the pulse motor 382 as the drive source for the first index feeding means 38 as in this preferred embodiment, the number of drive pulses of a drive signal output from the control means 8 to the pulse motor 382 may be counted to thereby detect the amount of index feed of the chuck table 36. As a modification, in the case of using a servo motor as a drive source for the first index feeding means 38, a rotary encoder for detecting the rotational speed of the servo motor may be provided. In this case, the pulse signal output from the rotary encoder is transmitted to the control means 8, and the number of pulses of the pulse signal input into the control means 8 is counted to thereby detect the amount of index feed of the chuck table 36.

The laser beam applying unit supporting mechanism 4 includes a pair of guide rails 41 provided on the stationary base 2 so as to extend parallel to each other in the index direction (Y direction) shown by the arrow Y and a movable support base 42 slidably supported to the guide rails 41 so as to be movable in the direction shown by the arrow Y. The movable support base 42 is composed of a horizontal portion 421 slidably supported to the guide rails 41 and a vertical portion 422 extending vertically upward from the upper surface of the horizontal portion 421. A pair of guide rails 423 are provided on one side surface of the vertical portion 422 so as to extend parallel to each other in the direction (Z direction) shown by the arrow Z. The laser beam applying unit supporting mechanism 4 shown in FIG. 1 further includes second index feeding means 43 (Y-direction moving means) for moving the movable support base 42 in the index direction (Y direction) shown by the arrow Y along the guide rails 41.

The second index feeding means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the index direction (Y direction) shown by the arrow Y along the guide rails 41 by driving the pulse motor 432 to normally or reversely rotate the externally threaded rod 431.

The vertical portion 422 of the movable support base 42 is provided with a pair of guide rails 423 extending parallel to each other in the direction (Z direction) shown by the arrow Z. On the other hand, the common unit holder 44 for holding the processing laser beam applying unit 5 and the measuring light beam applying unit 6 is formed with a pair of guided grooves 441 slidably fitted with the pair of guide rails 423. Accordingly, the common unit holder 44 is slidably supported to the vertical portion 422 of the movable support base 42 so as to be movable in the direction (Z direction) shown by the arrow Z by the slidable fit of the guided grooves 441 with the guide rails 423.

The laser processing machine shown in FIG. 1 further includes focal position adjusting means 45 for moving the unit holder 44 in the direction (Z direction) shown by the arrow Z along the guide rails 423, i.e., in the direction perpendicular to the holding surface of the chuck table 36. The focal position adjusting means 45 includes an externally threaded rod (not shown) extending parallel to the guide rails 423 so as to be interposed therebetween and a pulse motor 452 as a drive source for rotationally driving this externally threaded rod. Accordingly, the unit holder 44 is moved in the direction (Z direction) shown by the arrow Z along the guide rails 423 by driving the pulse motor 452 to normally or reversely rotate this externally threaded rod. In this preferred embodiment, when the pulse motor 452 is normally driven, the common unit holder 44 is moved upward, whereas when the pulse motor 452 is reversely driven, the common unit holder 44 is moved downward.

Figure 2:
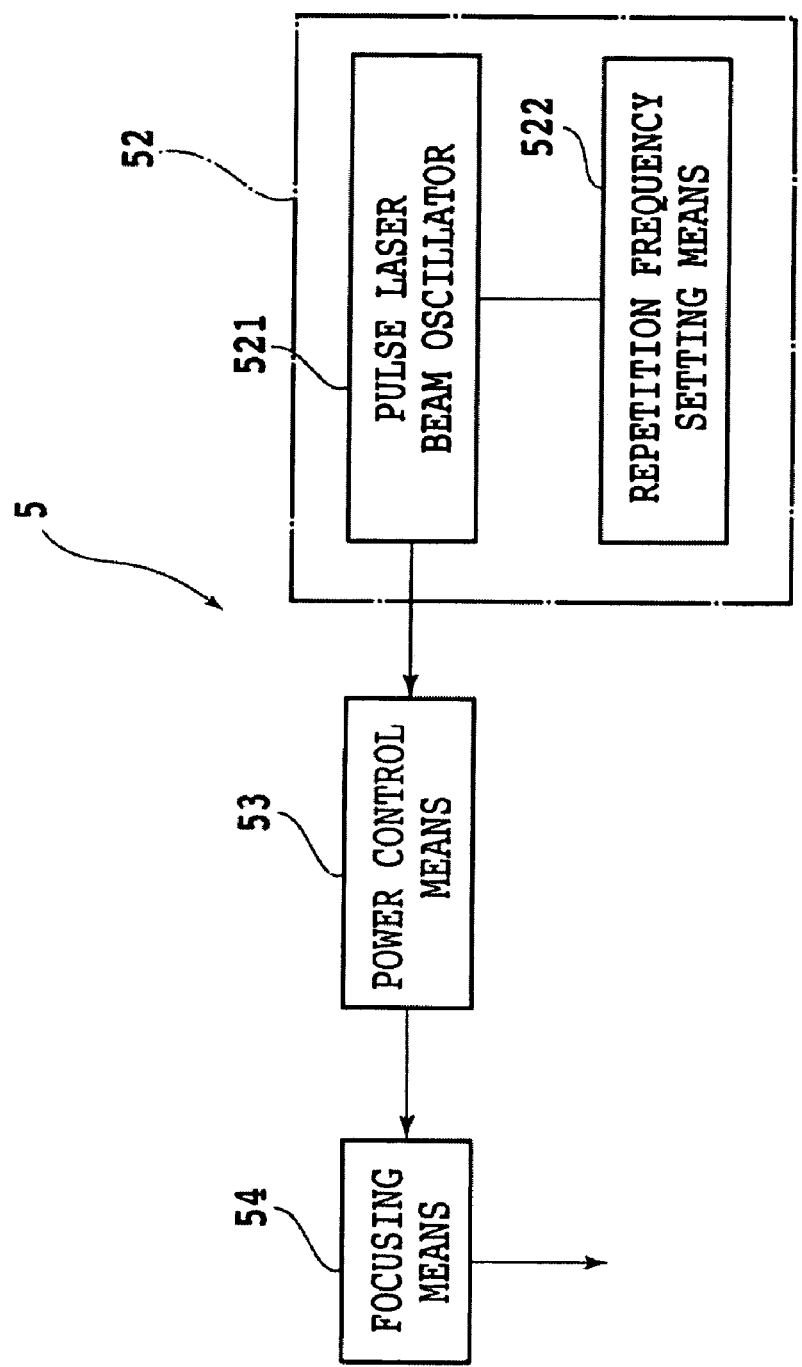
FIG. 2 is a block diagram of a processing laser beam applying unit included in the laser processing machine shown in FIG. 1.

The processing laser beam applying unit 5 includes a cylindrical casing 51 fixed to the unit holder 44 so as to extend substantially horizontally. As shown in FIG. 2, the processing laser beam applying unit 5 includes pulsed laser beam oscillating means 52, power control means 53, and focusing means 54. The pulsed laser beam oscillating means 52 and the power control means 53 are provided in the casing 51, and the focusing means 54 is mounted on the front end of the casing 51. The pulsed laser beam oscillating means 52 is composed of a pulsed laser beam oscillator 521 such as YAG laser oscillator or YVO4 laser oscillator and repetition frequency setting means 522 connected to the pulsed laser beam oscillator 521.

As shown in FIG. 1, imaging means 7 is provided at the front end portion of the casing 51 of the processing laser beam applying unit 5. The imaging means 7 includes an ordinary imaging device (Charge Coupled Device CCD) for imaging a workpiece by using visible light, infrared light applying means for applying infrared light to the workpiece, an optical system for capturing the infrared light applied by the infrared light applying means, and an imaging device (infrared CCD) for outputting an electrical signal corresponding to the infrared light captured by the optical system. This electrical signal as an image signal output from the imaging device is transmitted to the control means 8.

Figure 3:
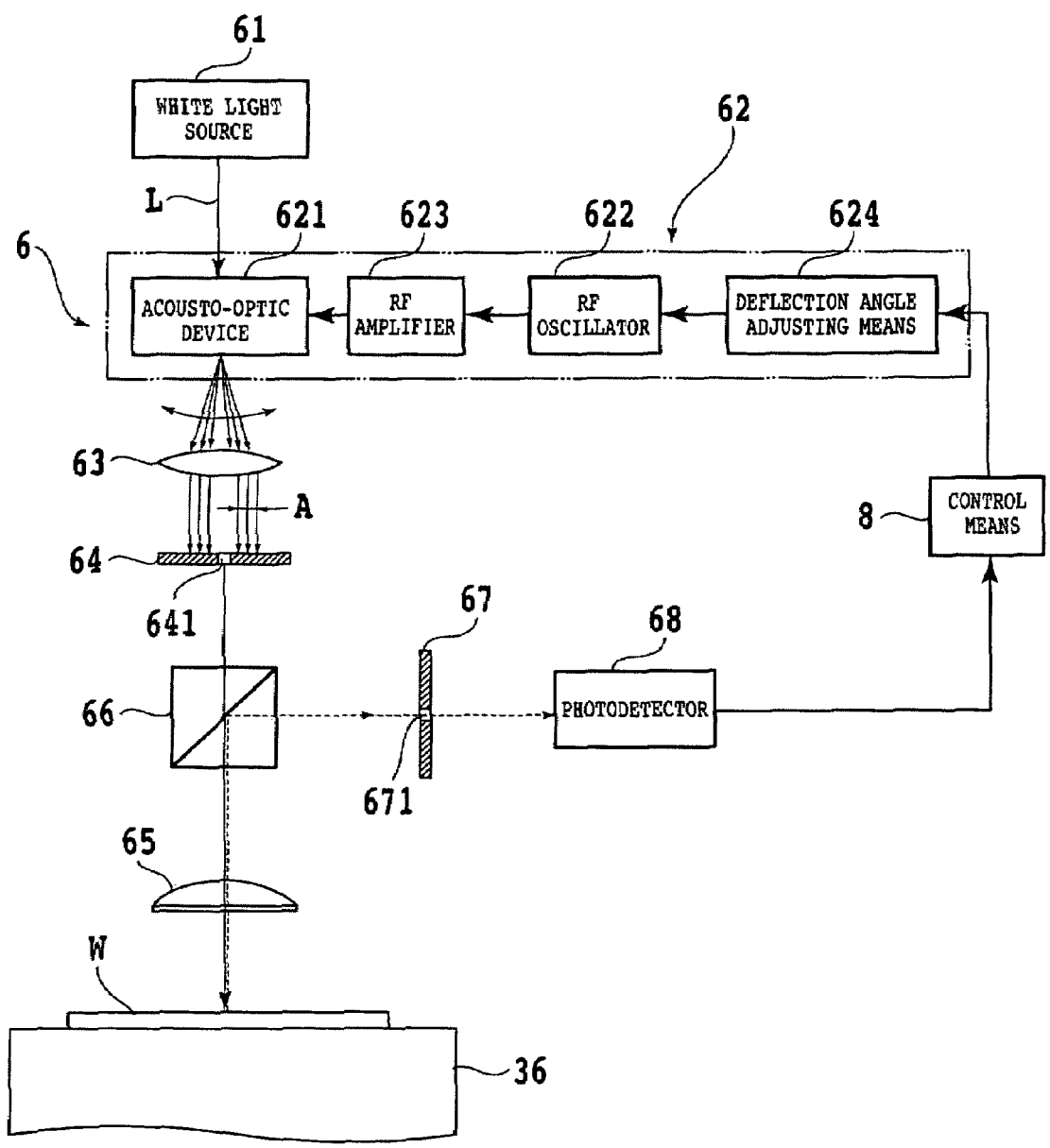
FIG. 3 is a block diagram of a measuring light beam applying unit included in the laser processing machine shown in FIG. 1.

The measuring light beam applying unit 6 constituting the measuring device for measuring the height of the workpiece held on the chuck table 36 will now be described with reference to FIGS. 1 and 3. As shown in FIG. 1, the measuring light beam applying unit 6 includes a cylindrical casing 60 fixed to the unit holder 44 so as to extend substantially horizontally. As shown in FIG. 3, the measuring light beam applying unit 6 includes a white light source 61 provided in the casing 60 for emitting white light, acousto-optic deflecting means 62 for separating the white light having various wavelengths emitted from the white light source 61 according to these wavelengths to produce diffracted light and for swinging the diffracted light over a predetermined angular range, an aberration correcting lens 63 for correcting the aberration of the diffracted light produced by the acousto-optic deflecting means 62, a first pinhole mask 64 for passing light having a part of the wavelengths of the diffracted light passed through the aberration correcting lens 63, a chromatic aberration lens 65 for focusing the light passed through the first pinhole mask 64 and for applying the focused light to a workpiece W held on the chuck table 36, a beam splitter 66 interposed between the first pinhole mask 64 and the chromatic aberration lens 65 for deflecting the reflected light from the workpiece W, a second pinhole mask 67 for passing the reflected light deflected by the beam splitter 66, and a photodetector 68 for detecting the reflected light passed through the second pinhole mask 67.

The white light source 61 may be provided by a white lamp or a light emitting diode (LED). The acousto-optic deflecting means 62 includes an acousto-optic device 621, an RF oscillator 622 for producing an RF (radio frequency) to be applied to the acousto-optic device 621, an RF amplifier 623 for amplifying the power of the RF produced by the RF oscillator 622 and applying the amplified RF to the acousto-optic device 621, and deflection angle adjusting means 624 for adjusting the frequency of the RF to be produced by the RF oscillator 622. The acousto-optic device 621 functions to produce the diffracted light from the white light emitted from the white light source 61 and to adjust the angle of deflection of the diffracted light according to the frequency of the RF applied. The deflection angle adjusting means 624 is controlled by the control means 8.

The aberration correcting lens 63 is an achromatic lens, which functions to correct the aberration of the diffracted light produced by the acousto-optic device 621. The first pinhole mask 64 has a pinhole 641 having a diameter of about 25 μm. The pinhole 641 functions to pass light having a part of the wavelengths of the diffracted light passed through the aberration correcting lens 63. The chromatic aberration lens 65 is a lens having chromatic aberration such as a gradium lens, which has a refractive index varying according to the wavelength of light. Accordingly, the focal length (focal position) of the chromatic aberration lens 65 varies according to the wavelength of the incident white light. The beam splitter 66 functions to transmit the light passed through the pinhole 641 of the first pinhole mask 64 toward the chromatic aberration lens 65 as shown by a solid line and to reflect the reflected light from the workpiece W so as to deflect it at 90 degrees as shown by a broken line.

The second pinhole mask 67 has a pinhole 671 for passing the reflected light deflected by the beam splitter 66. The pinhole 671 has a diameter of about 100 μm. The second pinhole mask 67 is preferably positioned so that the space between the first pinhole mask 64 and the beam splitter 66 is equal to the space between the beam splitter 66 and the second pinhole mask 67 so as to prevent the diffusion of the reflected light. The photodetector 68 is a photosensor for detecting the reflected light passed through the second pinhole mask 67 and transmitting an electrical signal corresponding to the intensity of the reflected light detected to the control means 8.

Figure 4:
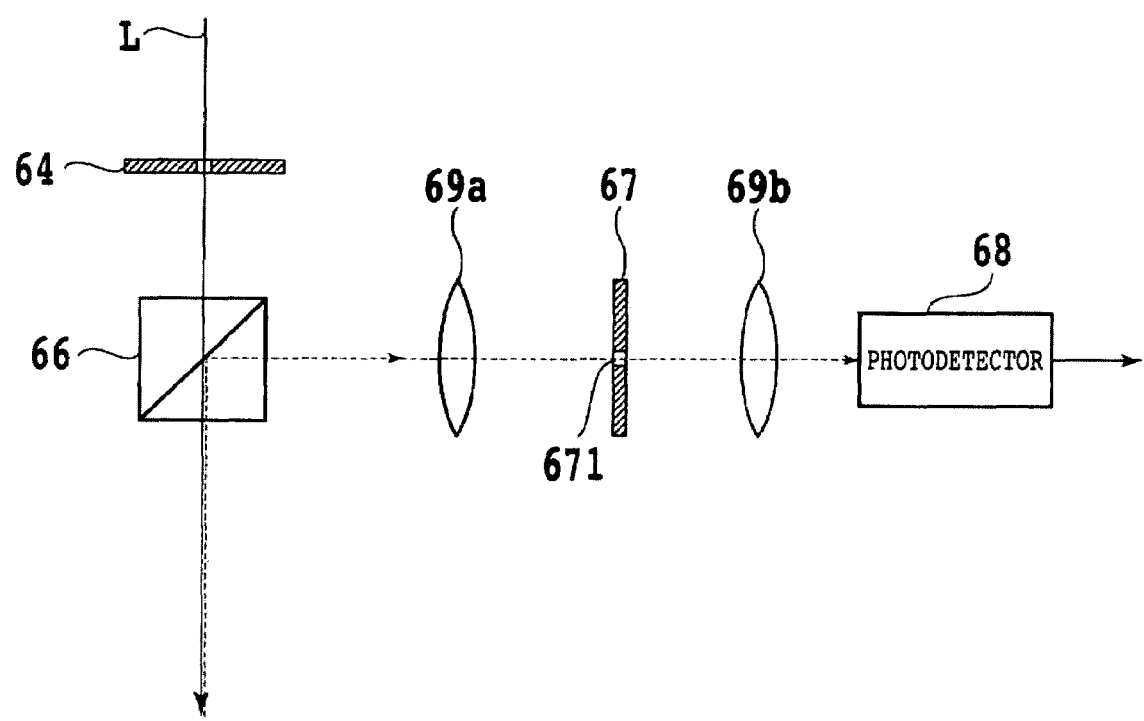
FIG. 4 is a block diagram showing an essential part of a modification of the measuring light beam applying unit shown in FIG. 1.

FIG. 4 shows another preferred embodiment wherein the space between the first pinhole mask 64 and the beam splitter 66 is different from the space between the beam splitter 66 and the second pinhole mask 67. In the preferred embodiment shown in FIG. 4, a first focusing lens 69a is provided upstream of the second pinhole mask 67 in the direction of propagation of the reflected light deflected by the beam splitter 66, and a second focusing lens 69b is provided downstream of the second pinhole mask 67 in the direction of propagation of the reflected light deflected by the beam splitter 66. The focal position of the first focusing lens 69a is set at the pinhole 671 of the second pinhole mask 67, and the focal position of the second focusing lens 69b is set on the photodetection surface of the photodetector 68. With this configuration, even when the reflected light deflected by the beam splitter 66 is diffused, this reflected light can be focused by the first focusing lens 69a to pass through the pinhole 671 of the second pinhole mask 67. Further, the reflected light passed through the pinhole 671 can be refocused by the second focusing lens 69b. In the case that the second pinhole mask 67 is mounted on the photodetection surface of the photodetector 68, the second focusing lens 69b is not required.

The operation of the measuring light beam applying unit 6 will now be described with reference to FIG. 3. The white light L emitted from the white light source 61 is separated into diffracted light having a wavelength range of 300 to 3000 nm, for example, as shown by the solid arrows in FIG. 3 when passing through the acousto-optic device 621 of the acousto-optic deflecting means 62. This diffracted light having a wavelength range of 300 to 3000 nm is shown by a flux A. The flux A is swung over a predetermined angular range according to a voltage applied to the deflection angle adjusting means 624. The voltage applied to the deflection angle adjusting means 624 is changed in the range of 1 to 10 V at a frequency of 10,000 to 50,000 cycles per second, for example. Accordingly, the white light L passed through the acousto-optic device 621 is deflected at a cycle of 1/10,000 to 1/50,000 second, and the flux A of diffracted light is swung at this cycle above the pinhole 641 of the first pinhole mask 64.

The flux A of diffracted light thus swung is passed through the aberration correcting lens 63, so that the aberration of the diffracted light is corrected and a part of the flux A passed through the central portion of the aberration correcting lens 63 is passed through the pinhole 641 of the first pinhole mask 64. Accordingly, the diffracted light passed through the pinhole 641 of the first pinhole mask 64 is the light having a predetermined wavelength range passed through the center of the aberration correcting lens 63 in swinging the flux A of diffracted light by means of the acousto-optic device 621. Thereafter, the diffracted light having a predetermined wavelength range passed through the pinhole 641 of the first pinhole mask 64 is transmitted through the beam splitter 66 to enter the chromatic aberration lens 65. The light incident on the chromatic aberration lens 65 is focused by the chromatic aberration lens 65 onto the workpiece W held on the chuck table 36.

The chromatic aberration lens 65 has a refractive index different according to the wavelength of light, i.e., it has a focal length different according to the wavelength of light. Accordingly, while the white light L converged by the chromatic aberration lens 65 is reflected on the upper surface of the workpiece W, a part of the incident white light L having a specific wavelength corresponding to the focal length between the chromatic aberration lens 65 and the upper surface of the workpiece W forms a beam spot having the smallest diameter on the upper surface of the workpiece W. This light focused on the upper surface of the workpiece W and reflected therefrom is deflected 90 degrees by the beam splitter 66 and next passed through the pinhole 671 of the second pinhole mask 67 to enter the photodetector 68 as shown by a broken line. Accordingly, the photodetector 68 thus having received the reflected light having a specific wavelength outputs a photodetection signal having a high intensity of light.

Figure 5:
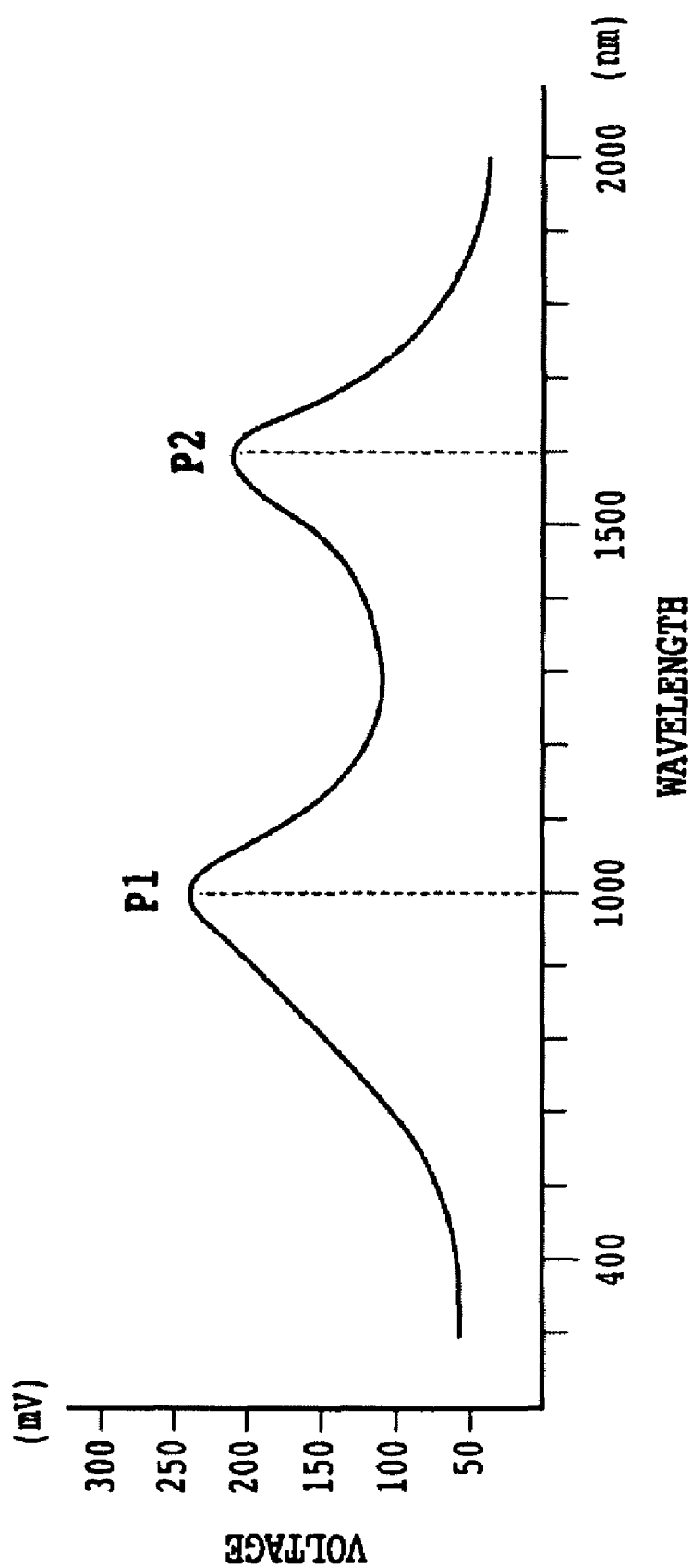
FIG. 5 is a graph showing a photodetection signal output from a photodetector included in the measuring light beam applying unit shown in FIG. 3.

Further, another part of the diffracted light having another specific wavelength is also focused by the chromatic aberration lens 65 through the thickness of the workpiece W onto the lower surface of the workpiece W, and is reflected with a minimum beam spot diameter from the lower surface of the workpiece W. Accordingly, this reflected light is also deflected 90 degrees by the beam splitter 66 and next passed through the pinhole 671 of the second pinhole mask 67 to enter the photodetector 68. As a result, the photodetector 68 outputs an electrical signal (photodetection signal) as shown in FIG. 5 during swinging of the flux A of diffracted light by means of the acousto-optic device 621 having received the white light L from the white light source 61. In FIG. 5, the horizontal axis represents the wavelength (nm) of the white light L, and the vertical axis represents the light intensity (voltage: mV) of the photodetection signal. As shown in FIG. 5, the photodetector 68 outputs two peak values P1 and P2 for the light intensity. The first peak value P1 corresponds to the wavelength of the diffracted light focused onto the upper surface of the workpiece W by the chromatic aberration lens 65, and the second peak value P2 corresponds to the wavelength of the diffracted light transmitted through the thickness of the workpiece W and focused onto the lower surface of the workpiece W. The first peak value P1 is higher than the second peak value P2.

The light not focused on the upper surface of the workpiece W and reflected therefrom forms a larger beam spot size, so that this reflected light is almost blocked by the second pinhole mask 67 and a slight remaining amount of light is passed through the pinhole 671. Accordingly, the photodetector 68 having received this reflected light outputs a photodetection signal having a low intensity of light. The control means 8 obtains the focal length of the chromatic aberration lens 65 depending on the wavelength of incident light according to the photodetection signal input from the photodetector 68, thereby obtaining the vertical position of the upper surface of the workpiece W (the height of the workpiece W) held on the chuck table 36.

Figure 6:
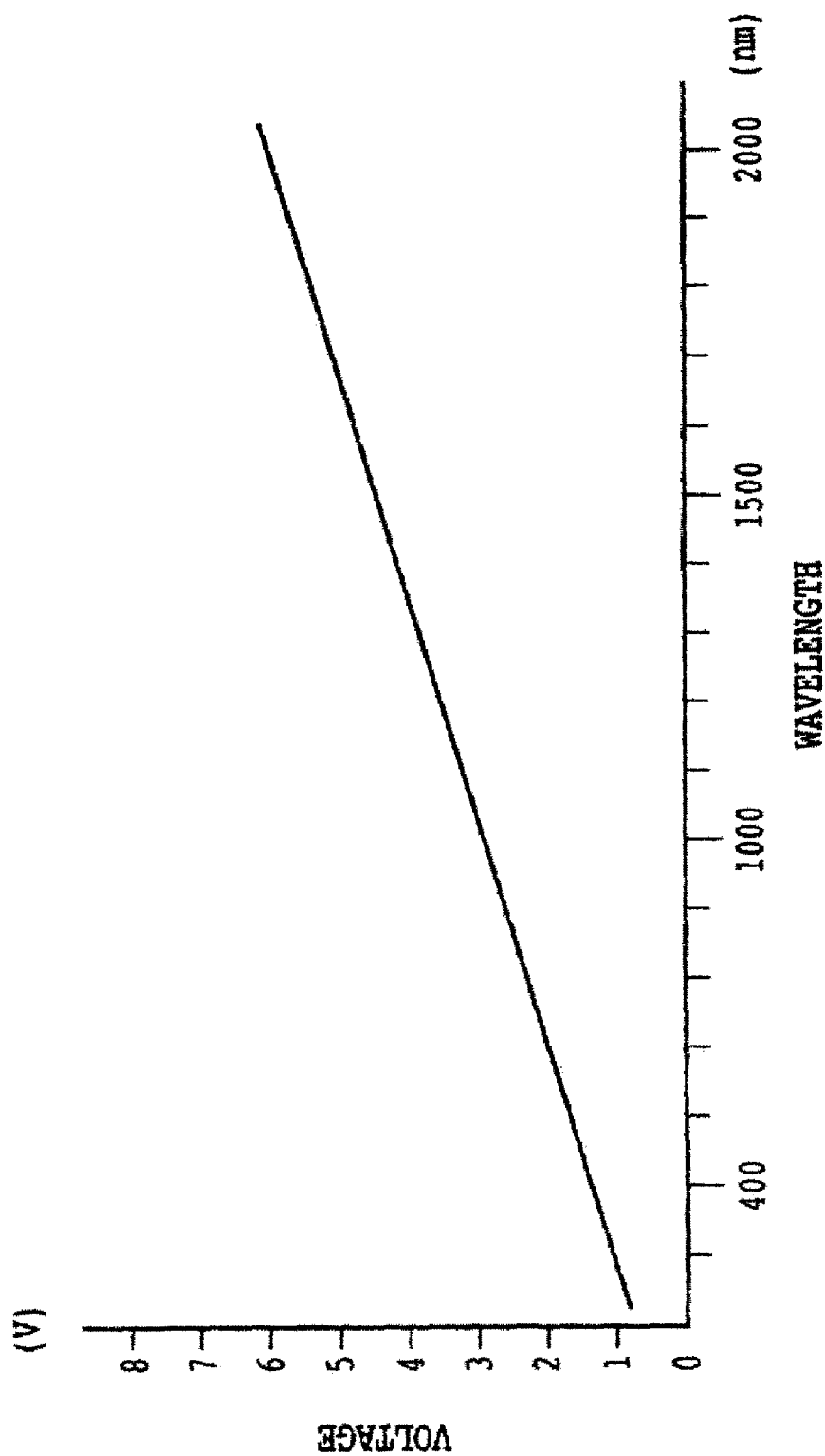
FIG. 6 is a first control map setting the relation between the voltage applied to deflection angle adjusting means of acousto-optic deflecting means and the wavelength of light passing through the pinhole of a first pinhole mask, the first control map being stored in a memory of control means included in the laser processing machine shown in FIG. 1.
Figure 7:
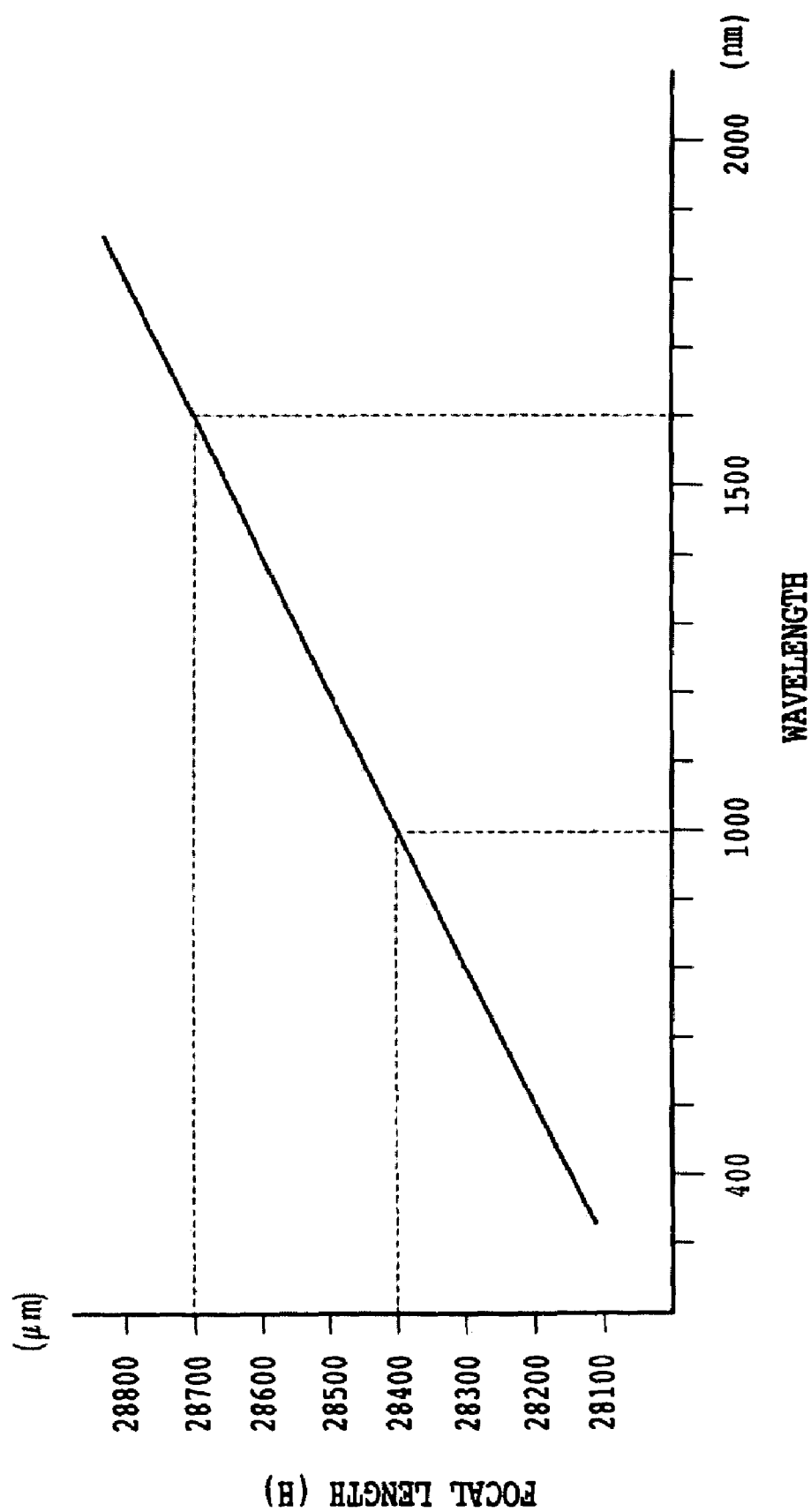
FIG. 7 is a second control map setting the relationship between the wavelength of light focused by a chromatic aberration lens and the focal length thereof, the second control map being stored in the memory of the control means included in the laser processing machine shown in FIG. 1.

The control means 8 has a first control map setting the relation between the voltage applied to the deflection angle adjusting means 624 of the acousto-optic deflecting means 62 and the wavelength of light passing through the pinhole 641 of the first pinhole mask 64 as shown in FIG. 6 and a second control map setting the relation between the wavelength of light focused by the chromatic aberration lens 65 and the focal length H thereof as shown in FIG. 7. The first and second control maps are stored in a memory to be hereinafter described. These control maps are prepared on the basis of experimental data.

Referring back to FIG. 1, the laser processing machine according to this preferred embodiment includes the control means 8. The control means 8 is provided by a computer, which includes a central processing unit (CPU) 81 for performing computations according to a control program, a read only memory (ROM) 82 preliminarily storing the control program, etc., a random access memory (RAM) 83 for storing computational results, etc., a counter 84, an input interface 85, and an output interface 86. Various detection signals from the work feed amount detecting means 374, the index feed amount detecting means 384, and the imaging means 7 are input into the input interface 85 of the control means 8. Further, various control signals are output from the output interface 86 of the control means 8 to the pulse motor 372, the pulse motor 382, the pulse motor 432, the pulse motor 452, the processing laser beam applying unit 5, the measuring light beam applying unit 6, and the like. The random access memory (RAM) 83 includes a first memory area 83a for storing the first control map shown in FIG. 6, a second memory area 83b for storing the second control map shown in FIG. 7, a third memory area 83c for storing data on design value of the workpiece W to be hereinafter described, a fourth memory area 83d for storing values for the height of a semiconductor wafer 10 to be hereinafter described, and other memory areas.

Figure 8:
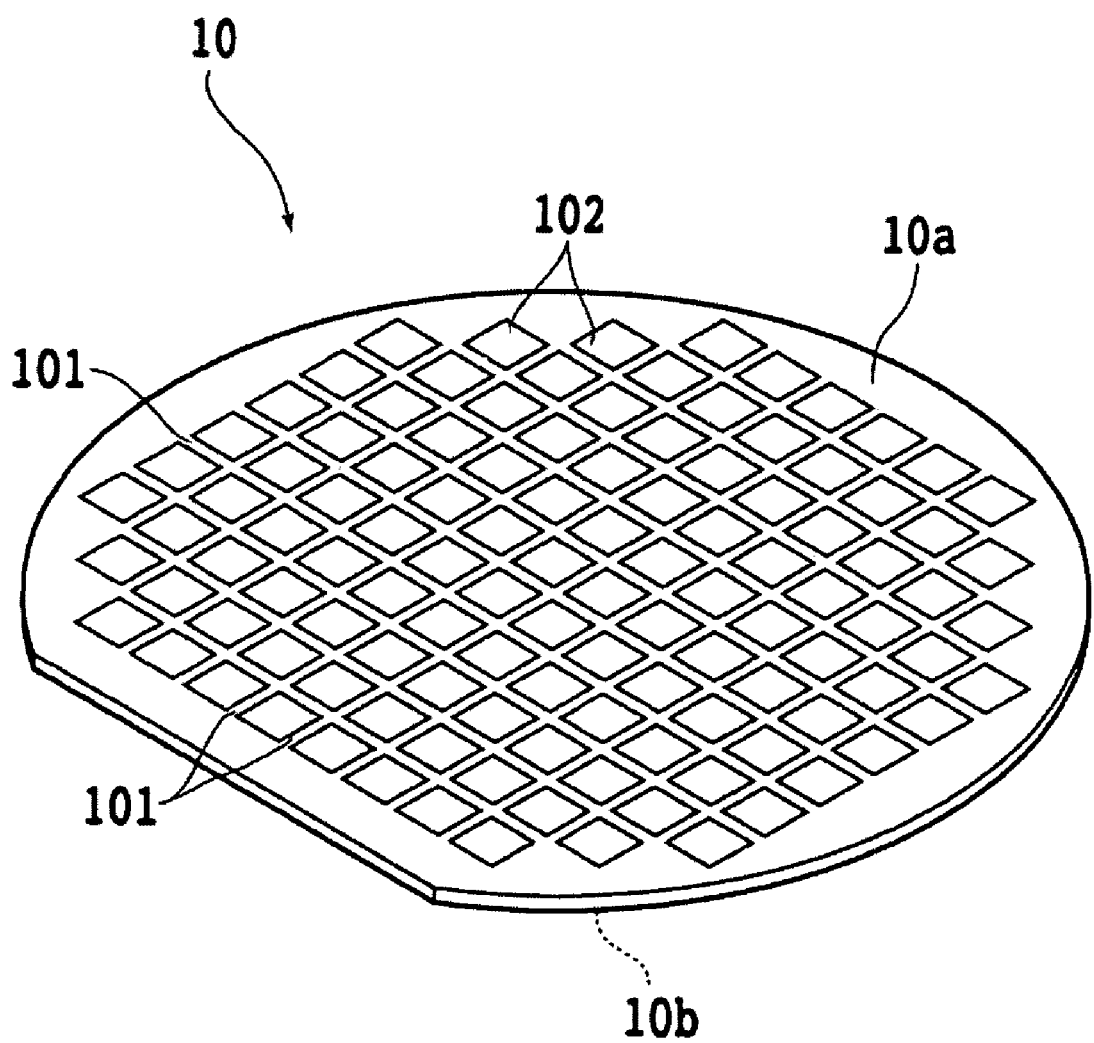
FIG. 8 is a perspective view of a semiconductor wafer as a workpiece to be processed by the laser processing machine shown in FIG. 1.

The operation of the laser processing machine according to this preferred embodiment will now be described. FIG. 8 is a perspective view of the semiconductor wafer 10 as a workpiece to be processed by the laser processing machine. The semiconductor wafer 10 is provided by a silicon wafer, which has a front side (upper surface) 10a and a back side (lower surface) 10b. The upper surface 10a of the semiconductor wafer 10 is formed with a plurality of crossing streets (separation lines) 101 to thereby define a plurality of partitioned regions arranged like a matrix, and a plurality of devices 102 such as ICs and LSIs are formed in these partitioned regions.

The laser processing machine performs laser processing such that a laser beam is applied to the semiconductor wafer 10 along the streets 101 to thereby form altered layers in the semiconductor wafer 10 along the streets 101. If there are variations in the thickness of the semiconductor wafer 10, the altered layers cannot be formed uniformly at a predetermined depth in the semiconductor wafer 10 in relation to a refractive index. Accordingly, prior to performing the laser processing, the height of the semiconductor wafer 10 held on the chuck table 36 is measured by the measuring device mentioned above. More specifically, the semiconductor wafer 10 is placed on the chuck table 36 of the laser processing machine shown in FIG. 1 in the condition where the back side 10b of the semiconductor wafer 10 is exposed, and the semiconductor wafer 10 is then held by suction on the chuck table 36. The chuck table 36 thus holding the semiconductor wafer 10 is moved to a position directly below the imaging means 7 by the work feeding means 37 (X-direction moving means).

When the chuck table 36 is positioned directly below the imaging means 7, an alignment operation for detecting a processed area of the semiconductor wafer 10 to be laser-processed is performed by the imaging means 7 and the control means 8. More specifically, the imaging means 7 and the control means 8 perform image processing such as pattern matching for making the alignment of the streets 101 extending in a predetermined direction on the semiconductor wafer 10 and the chromatic aberration lens 65 of the measuring light beam applying unit 6 for detecting the height of the semiconductor wafer 10 along these streets 101, thus performing the alignment of height detection position. Similarly, the alignment of height detection position is performed for the other streets 101 extending in a direction perpendicular to the above-mentioned predetermined direction on the semiconductor wafer 10. The front side 10a of the semiconductor wafer 10 on which the streets 101 are formed is attached to the chuck table 36. However, the imaging means 7 includes infrared light applying means, an optical system for capturing infrared light, and an imaging device (infrared CCD) for outputting an electrical signal corresponding to the infrared light. Accordingly, the streets 101 can be imaged by transmitting the infrared light from the back side 10b of the semiconductor wafer 10 through the thickness of the semiconductor wafer 10 to the front side 10a of the semiconductor wafer 10.

Figure 9A:
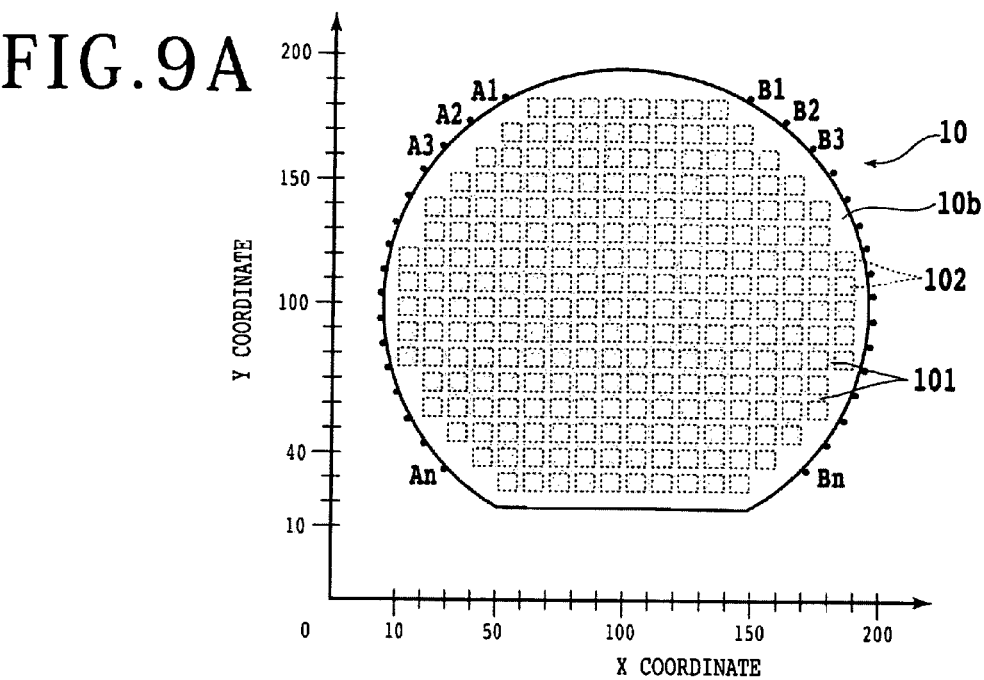
FIG. 9A is a plan view of the semiconductor wafer shown in FIG. 8, showing the X, Y coordinates of the set position of the semiconductor wafer held on the chuck table.
Figure 9B:
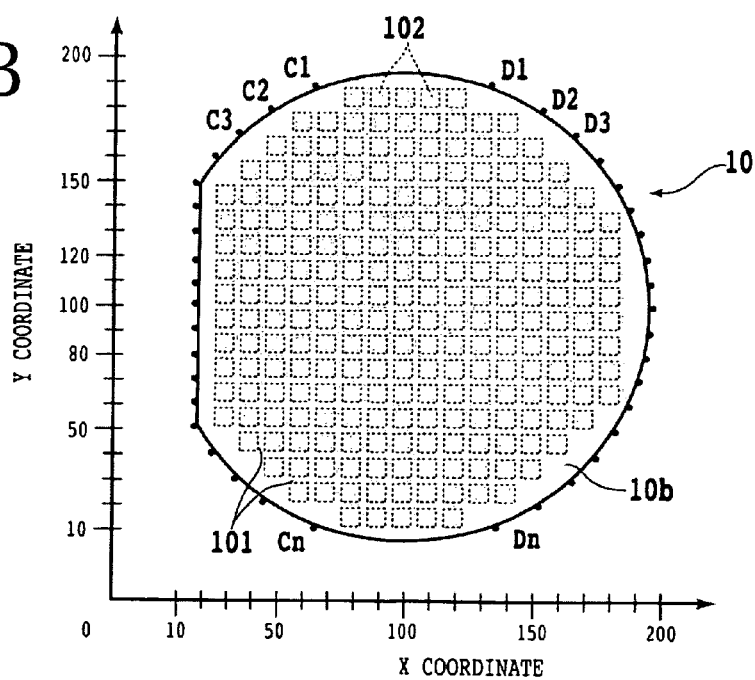
FIG. 9B is a plan view showing a condition obtained by 90 degrees rotating the chuck table holding the semiconductor wafer shown in FIG. 9A.

By performing the alignment mentioned above, the semiconductor wafer 10 held on the chuck table 36 is positioned as shown by X, Y coordinates in FIG. 9A. FIG. 9B shows a condition obtained by 90 degrees rotating the chuck table 36, or the semiconductor wafer 10 shown in FIG. 9A. In FIG. 9A, reference symbols A1 to An denote feed start coordinate positions for the streets 101 extending in a first predetermined direction, and reference symbols B1 to Bn denote feed end coordinate positions for the streets 101 extending in the first predetermined direction. In FIG. 9B, reference symbols C1 to Cn denote feed start coordinate positions for the other streets 101 extending in a second predetermined direction perpendicular to the first predetermined direction, and reference symbols D1 to Dn denote feed end coordinate positions for the other streets 101 extending in the second predetermined direction. The data on these design values are stored in the third memory area 83c of the random access memory (RAM) 83.

Figure 10:
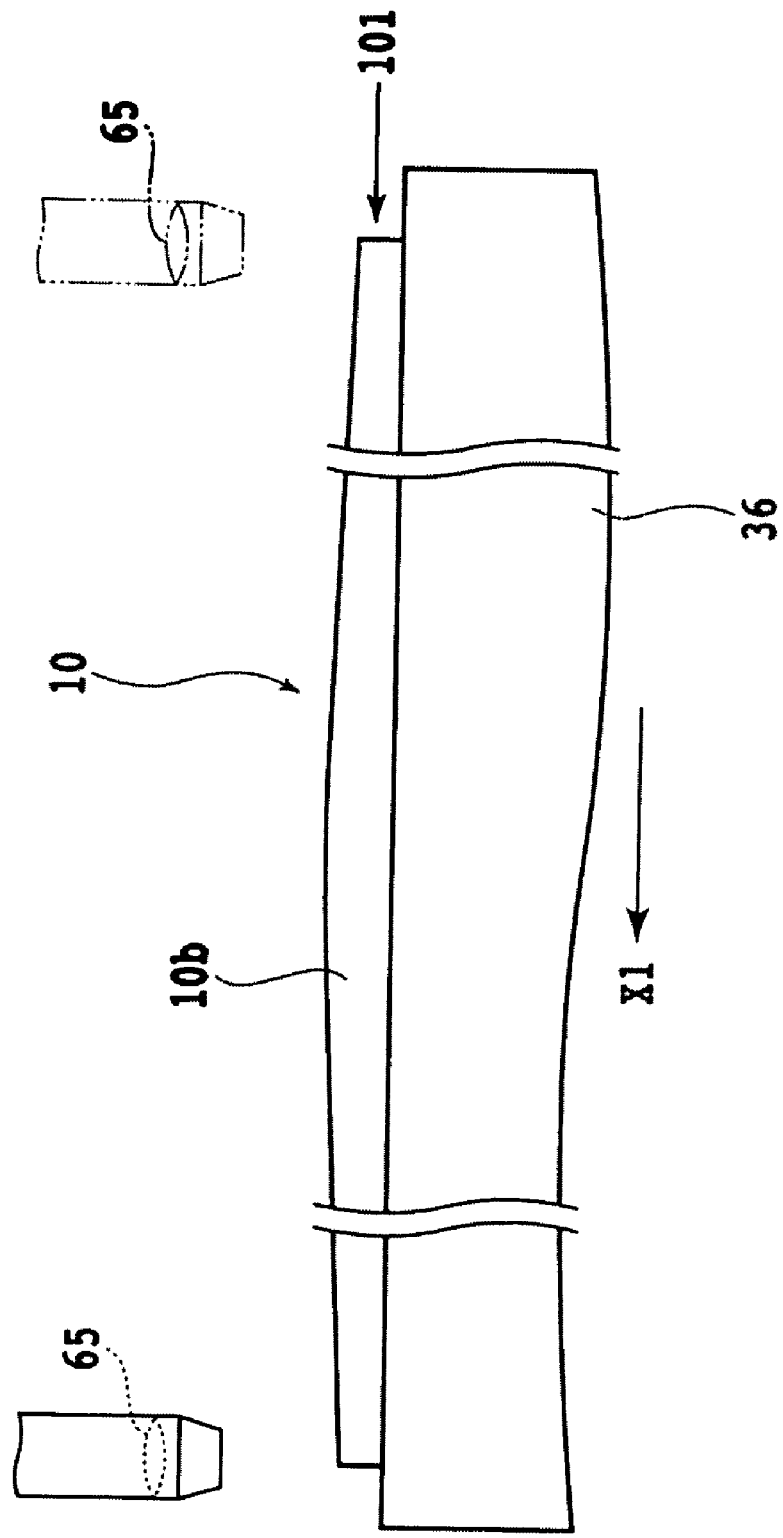
FIG. 10 is a side view for illustrating a height detecting step to be performed by the measuring device according to this preferred embodiment.

After detecting the streets 101 extending in the first predetermined direction to perform the alignment of height detection position as mentioned above, the chuck table 36 is moved in the Y direction to locate the uppermost street 101 as viewed in FIG. 9A (corresponding to a line connecting the coordinate positions A1 and B1) directly below the chromatic aberration lens 65 of the measuring light beam applying unit 6. Thereafter, the chuck table 36 is further moved in the X direction to locate the feed start coordinate position A1 as one end (left end as viewed in FIG. 9A) of the uppermost street 101 directly below the chromatic aberration lens 65. This condition is shown by a solid line in FIG. 10. Thereafter, the measuring light beam applying unit 6 is operated and the chuck table 36 is moved in the direction shown by an arrow X1 in FIG. 10 until the feed end coordinate position B1 is located directly below the chromatic aberration lens 65 (height detecting step).

In the operation of the measuring light beam applying unit 6, the photodetector 68 continues to transmit the photodetection signal shown in FIG. 5 to the control means 8. The control means 8 obtains the wavelength of light passing through the pinhole 641 of the first pinhole mask 64 when the peak value of the light intensity in the photodetection signal shown in FIG. 5 is detected at regular intervals of 1 μm. The wavelength of light passing through the pinhole 641 of the first pinhole mask 64 can be obtained according to the first control map shown in FIG. 6 from the voltage applied to the deflection angle adjusting means 624 of the acousto-optic deflecting means 62 when the peak value of the light intensity of the reflected light detected by the photodetector 68 corresponds to the first peak value P1 (e.g., 250 mV). For example, the voltage applied to the deflection angle adjusting means 624 is changed in the range of 1 to 10 V at 10000 cycles per second, so that the flux A of the diffracted light is passed through the pinhole 641 of the first pinhole mask 64 at 10000 cycles per second. When the peak value P1 or P2 is detected, the wavelength of light is obtained from the first control map shown in FIG. 6 according to the voltage applied to the deflection angle adjusting means 624.

Figure 11:
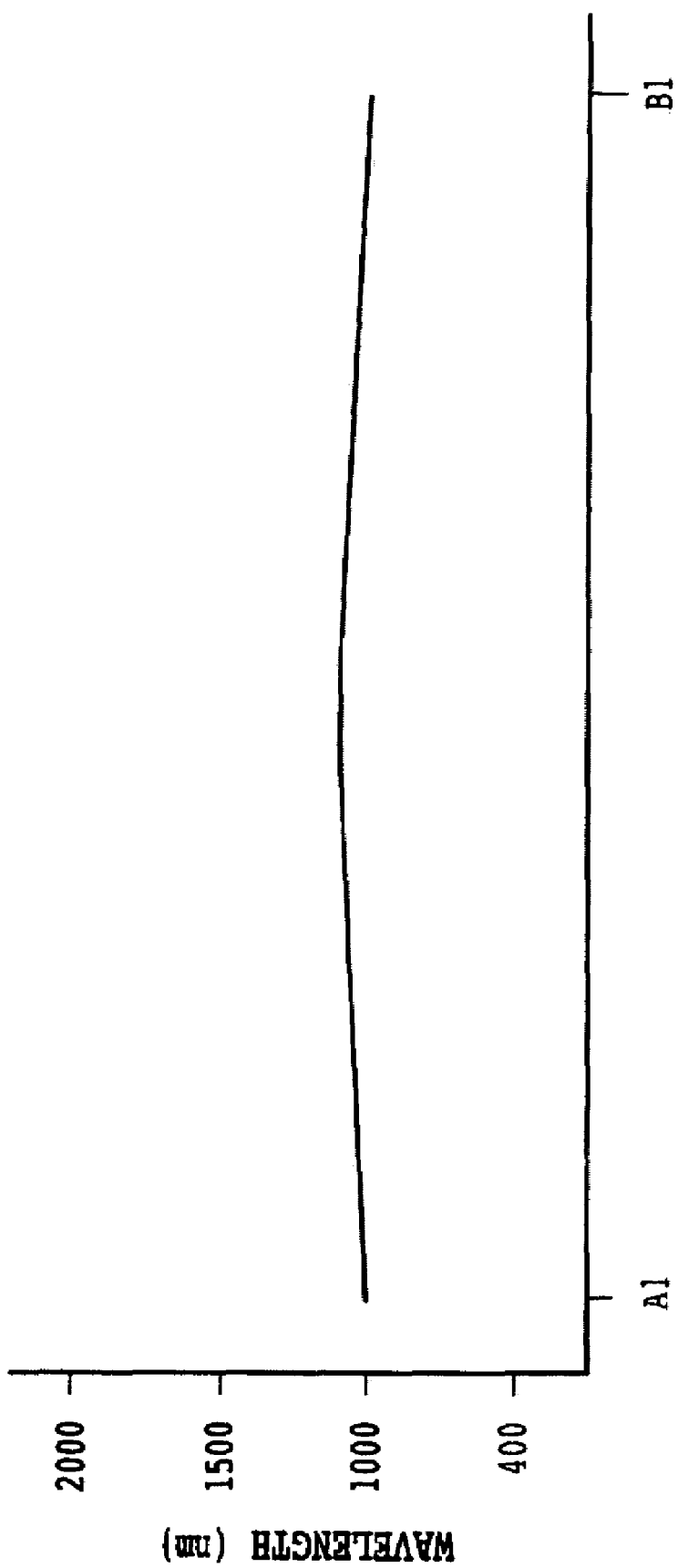
FIG. 11 is a graph showing a peak value for the intensity of light in the range from a feed start coordinate position A1 to a feed end coordinate position B1 along a street on the semiconductor wafer detected in the height detecting step shown in FIG. 10.
Figure 12:
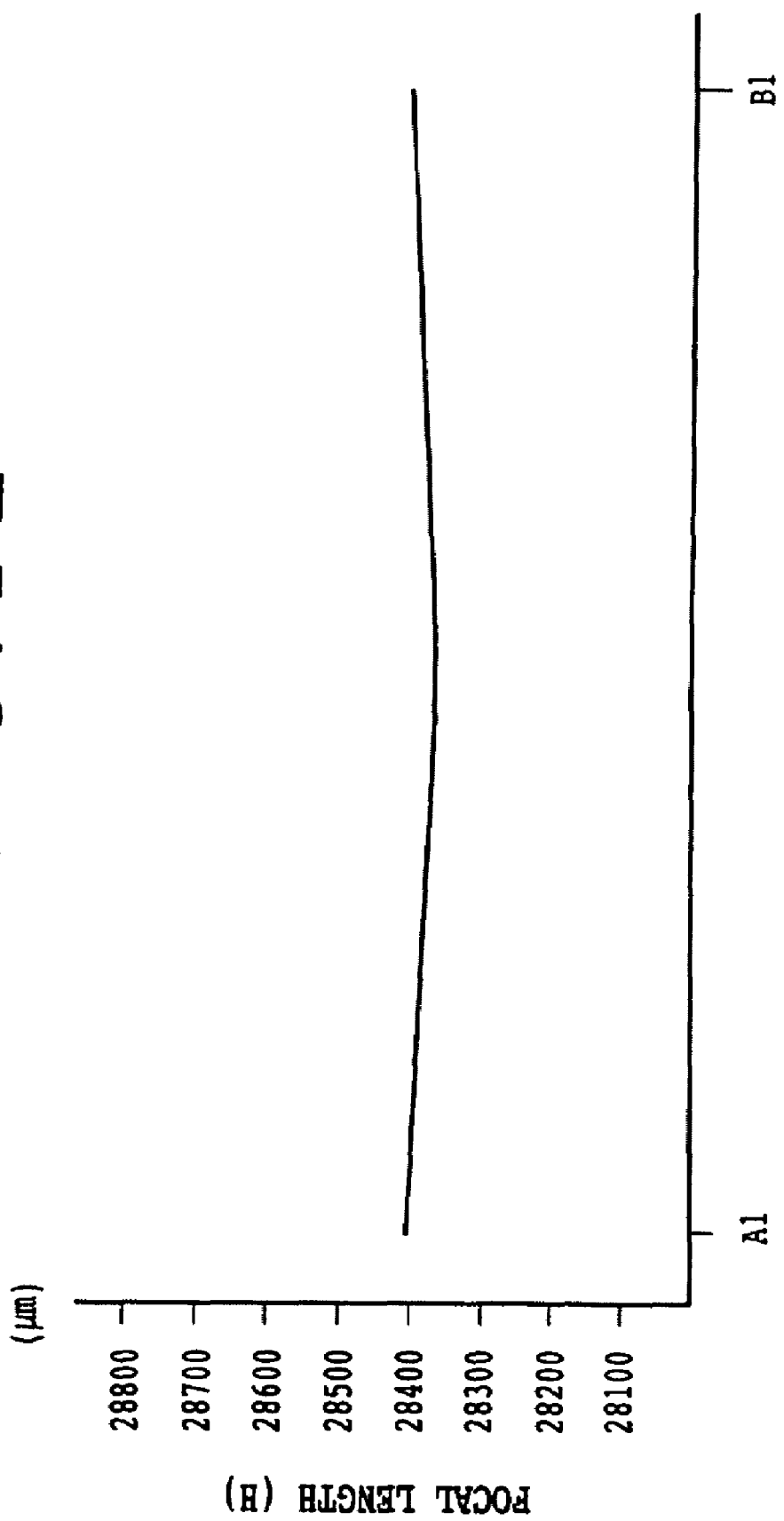
FIG. 12 is a graph showing the focal length of the chromatic aberration lens varying with the values for the wavelength in the range from the feed start coordinate position A1 to the feed end coordinate position B1 along the street shown in FIG. 11.

As a result, it is possible to obtain the wavelength of light showing the peak value for the light intensity from the feed start coordinate position A1 to the feed end coordinate position B1 along the uppermost street 101 (as viewed in FIG. 9A) on the semiconductor wafer 10 as shown in FIG. 11. The above-obtained values for the wavelength of light from the feed start coordinate position A1 to the feed end coordinate position B1 along the uppermost street 101 are stored into the fourth memory area 83d of the random access memory (RAM) 83. Thereafter, the control means 8 obtains the values for the focal length H corresponding to the values for the wavelength of light from the feed start coordinate position A1 to the feed end coordinate position B1 along the uppermost street 101 shown in FIG. 11 by using the second control map shown in FIG. 7, thereby measuring the height of the semiconductor wafer 10 (the focal length of the chromatic aberration lens 65 varying according to the wavelength of light) from the feed start coordinate position A1 to the feed end coordinate position B1 as shown in FIG. 12. These values for the height of the semiconductor wafer 10 as measured above are stored into the fourth memory area 83d of the random access memory (RAM) 83. This height detecting step is performed for all of the streets 101 formed on the semiconductor wafer 10, and the measured values for the height along each street 101 are stored into the fourth memory area 83d of the random access memory (RAM) 83.

Figure 13A:
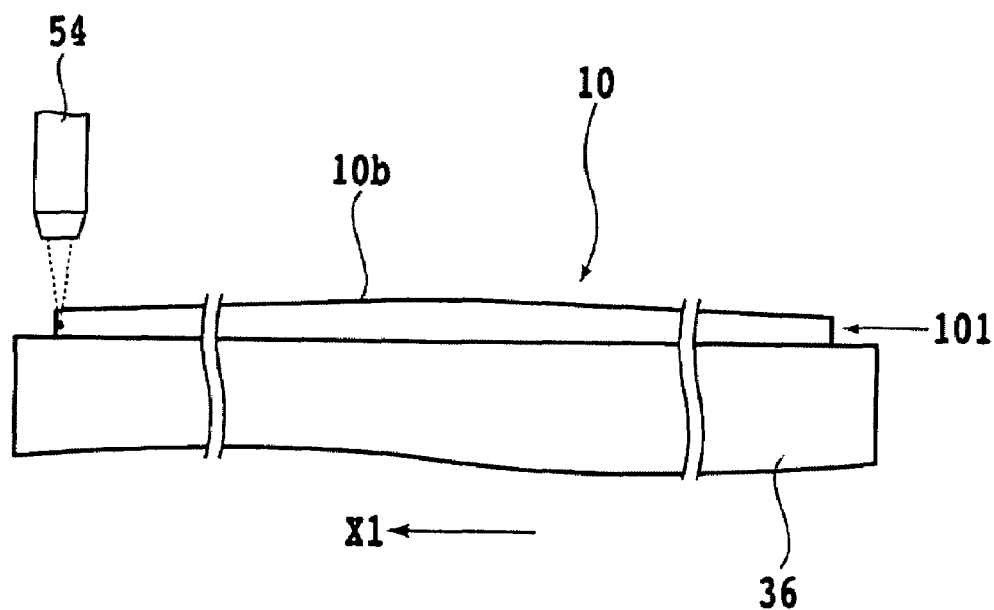
FIGS. 13A and 13B are side views for illustrating a processing step for forming an altered layer in the semiconductor wafer by using the laser processing machine shown in FIG. 1.

After performing the height detecting step along all of the streets 101 formed on the semiconductor wafer 10 as mentioned above, laser processing is performed to form an altered layer along each street 101 inside the semiconductor wafer 10. First, the chuck table 36 is moved to locate the uppermost street 101 as viewed in FIG. 9A directly below the focusing means 54 of the processing laser beam applying unit 5. Thereafter, the feed start coordinate position A1 (see FIG. 9A) as one end (left end) of the uppermost street 101 is located directly below the focusing means 54 as shown in FIG. 13A. In this condition, the focal point P of a pulsed laser beam to be applied from the focusing means 54 is adjusted to a predetermined depth from the back side 10b (upper surface as viewed in FIG. 13A) of the semiconductor wafer 10. Thereafter, the processing laser beam applying unit 5 is operated to apply the pulsed laser beam from the focusing means 54 to the inside of the semiconductor wafer 10, and the chuck table 36 is moved at a predetermined feed speed in the direction shown by an arrow X1 in FIG. 13A (laser processing step).

Figure 13B:
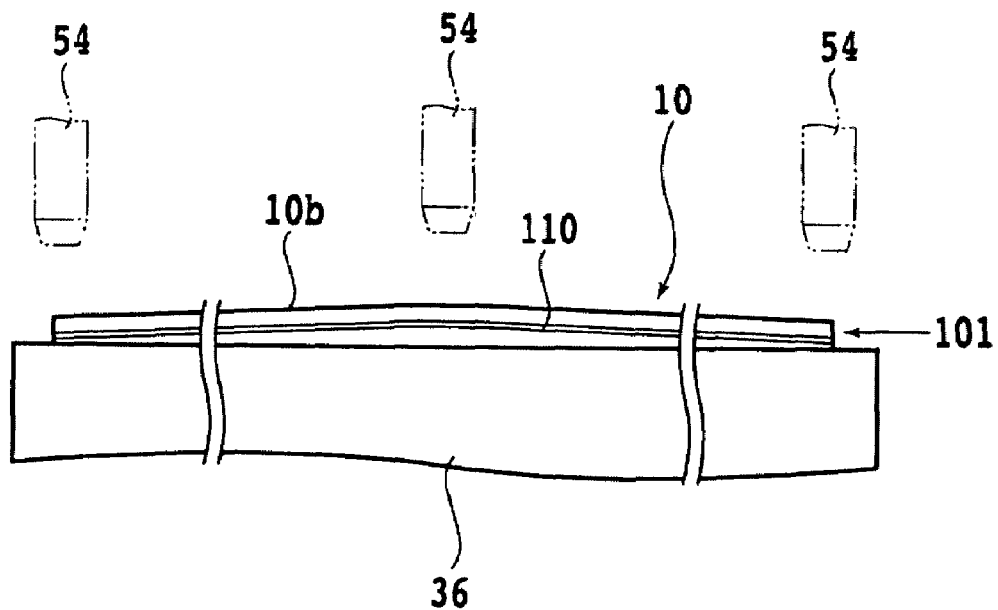

When the focal point P of the pulsed laser beam applied from the focusing means 54 reaches the other end of the uppermost street 101 (the right end as viewed in FIG. 13B), the application of the pulsed laser beam is stopped and the movement of the chuck table 36 is also stopped. In this laser processing step, the control means 8 controls the pulse motor 452 of the focal position adjusting means 45 according to the values for the height of the semiconductor wafer 10 along each street 101 stored in the fourth memory area 83d of the random access memory (RAM) 83, thereby vertically moving the focusing means 54 according to the values for the height of the semiconductor wafer 10 along each street 101 as shown in FIG. 13B. As a result, an altered layer 110 is formed in the semiconductor wafer 10 at a predetermined depth from the back side 10b (upper surface as viewed in FIG. 13B) so as to extend parallel to the back side 10b as shown in FIG. 13B.

For example, the laser processing step mentioned above is performed under the following processing conditions.

Figure 14:
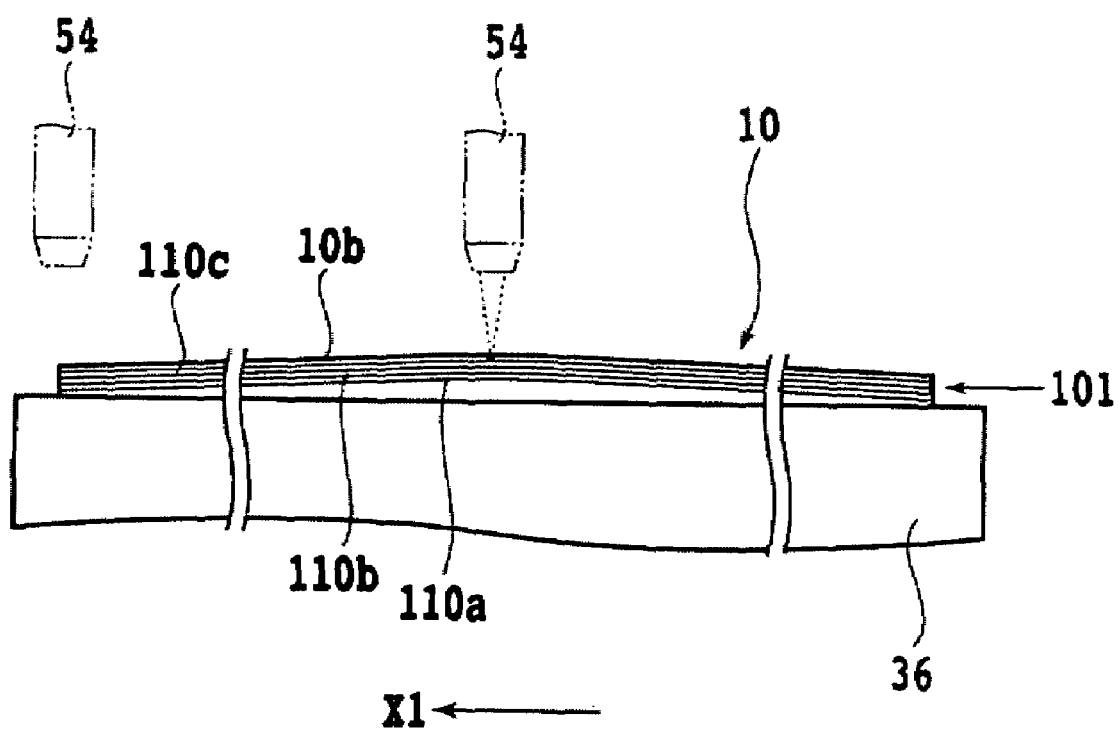
FIG. 14 is a view similar to FIG. 13B, showing a processing step in the case that the thickness of the semiconductor wafer is large.

Laser: YVO4 pulsed laser
Wavelength: 1064 nm
Repetition frequency: 100 kHz
Pulse output: 2.5 μJ
Focused spot diameter: φ1 μm
Work feed speed: 100 mm/sec In the case that the thickness of the semiconductor wafer 10 is large, the focal point P is preferably changed stepwise to repeatedly perform the laser beam applying step mentioned above along the same street 101, thereby forming a plurality of altered layers 110a, 110b, and 110c as shown in FIG. 14. In the case shown in FIG. 14, the altered layers 110a, 110b, and 110c are formed preferably by stepwise raising the focal point P in the order of 110a, 110b, and 110c.

After performing the laser processing step along all the streets 101 extending in the first predetermined direction on the semiconductor wafer 10, the chuck table 36 is rotated 90 degrees to similarly perform the laser processing step along the other streets 101 extending in the second predetermined direction on the semiconductor wafer 10 perpendicular to the first predetermined direction. Thus, the laser processing step is completed along all of the streets 101 formed on the semiconductor wafer 10. Thereafter, the chuck table 36 holding the semiconductor wafer 10 is returned to the original position to cancel the suction holding of the semiconductor wafer 10. Thereafter, the semiconductor wafer 10 is subjected to a separating step by transporting means (not shown).

The measurement of the thickness of the workpiece W by the measuring device mentioned above will now be described with reference to FIG. 3. As shown in FIG. 3, the measuring light beam applying unit 6 is operated in the condition where the measurement position of the workpiece W is set directly below the chromatic aberration lens 65. More specifically, the control means 8 operates to turn on the white light source 61 and to change the voltage applied to the deflection angle adjusting means 624 of the acousto-optic deflecting means 62, thereby swinging the flux A of diffracted light produced by the acousto-optic device 621. As a result, the flux A of diffracted light passing through the aberration correcting lens 63 is partially passed through the pinhole 641 of the first pinhole mask 64. Thereafter, the diffracted light passing through the pinhole 641 is transmitted through the beam splitter 66 to enter the chromatic aberration lens 65. The diffracted light is focused by the chromatic aberration lens 65 onto the workpiece W held on the chuck table 36.

The diffracted light having a first specific wavelength is focused on the upper surface of the workpiece W, and the diffracted light having a second specific wavelength is transmitted through the thickness of the workpiece W and focused on the lower surface of the workpiece W. These diffracted lights having the first and second wavelengths are reflected from the upper and lower surfaces of the workpiece W, respectively, as shown by the broken line in FIG. 3. The reflected light from the workpiece W is reflected by the beam splitter 66 and passed through the pinhole 671 of the second pinhole mask 67 to enter the photodetector 68. The photodetector 68 detects the reflected light to output a photodetection signal as shown in FIG. 5. In the photodetection signal shown in FIG. 5, the first peak value P1 corresponds to the wavelength of the diffracted light focused onto the upper surface of the workpiece W by the chromatic aberration lens 65, and the second peak value P2 corresponds to the wavelength of the diffracted light transmitted through the thickness of the workpiece W and focused onto the lower surface of the workpiece W. The wavelengths corresponding to the first and second peak values P1 and P2 can be obtained from the voltages applied to the deflection angle adjusting means 624 of the acousto-optic deflecting means 62 according to the first control map shown in FIG. 6 when the first and second peak values P1 and P2 are output from the photodetector 68.

The control means 8 applies the wavelengths of the first and second peak values P1 and P2 to the second control map shown in FIG. 7 to thereby obtain the focal lengths H1 and H2 respectively corresponding to the wavelengths of the first and second peak values P1 and P2. By subtracting the focal length H1 corresponding to the wavelength of the first peak value P1 from the focal length H2 corresponding to the wavelength of the second peak value P2, the thickness of the workpiece W is obtained. In the case shown in FIG. 5, the wavelength of the first peak value P1 is 1000 nm, and the wavelength of the second peak value P2 is 1600 nm. Accordingly, by applying the wavelength (1000 nm) of the first peak value P1 to the second control map shown in FIG. 7, the focal length H1 is obtained as 28,400 μm. Similarly, by applying the wavelength (1600 nm) of the second peak value P2 to the second control map shown in FIG. 7, the focal length H2 is obtained as 28,700 μm. Accordingly, the control means 8 computes the thickness t of the workpiece W as t=H2−H1=28,700 μm−28,400 μm=300 μm. As a result, the thickness t of the workpiece W is determined as 300 μm by the control means 8.

In the case of forming a via hole reaching a bonding pad through a semiconductor wafer by using a pulsed laser beam, the number of pulses corresponding to the thickness of the workpiece as measured above can be set, so that the via hole can be accurately formed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A measuring device for measuring the height of a workpiece held on a chuck table included in a processing machine, said measuring device comprising:
a white light source for emitting white light;
acousto-optic deflecting means for separating said white light emitted from said white light source to produce a flux of diffracted light and for swinging the flux of said diffracted light over a predetermined angular range by applying a voltage;
a first pinhole mask configured to pass light having a part of the wavelengths of said diffracted light produced by said acousto-optic deflecting means;
a chromatic aberration lens configured to focus the light passed through said first pinhole mask and to apply the focused light to said workpiece held on said chuck table;
a beam splitter interposed between said first pinhole mask and said chromatic aberration lens configured to deflect the light reflected from said workpiece;
a second pinhole mask configured to pass the reflected light deflected by said beam splitter;
a photodetector configured to detect the reflected light passed through said second pinhole mask and to output a photodetection signal corresponding to the intensity of the reflected light detected; and
control means for outputting a control signal to said acousto-optic deflecting means and for obtaining the height of said workpiece held on said chuck table according to said photodetection signal input from said photodetector,
wherein said control means includes a memory configured to store a first control map setting the relation between the voltage applied to said acousto-optic deflecting means and the wavelength of light passing through said first pinhole mask and a second control map setting the relation between the wavelength of light focused by said chromatic aberration lens and the focal length of said chromatic aberration lens,
a value for the voltage applied to said acousto-optic deflecting means corresponding to a peak value for the light intensity detected by said photodetector is obtained by said control means,
said above-obtained voltage value is applied to said first control map to thereby obtain the wavelength of light passing through said first pinhole mask, and
said above-obtained wavelength of light passing through said first pinhole mask is applied to said second control map to thereby measure the height of said workpiece held on said chuck table.

2. The measuring device according to claim 1, further comprising an aberration correcting lens interposed between said acousto-optic deflecting means and said first pinhole mask configured to correct the aberration of said diffracted light produced by said acousto-optic deflecting means.

3. The measuring device according to claim 1, further comprising:
a first focusing lens provided upstream of said second pinhole mask in the direction of propagation of the reflected light deflected by said beam splitter; and
a second focusing lens provided downstream of said second pinhole mask in the direction of propagation of the reflected light deflected by said beam splitter,
wherein the focal position of said first focusing lens is set at the pinhole of said second pinhole mask.

4. The measuring device according to claim 1, further comprising:
X-direction moving means for relatively moving said chromatic aberration lens and said chuck table in an X direction;
Y-direction moving means for relatively moving said chromatic aberration lens and said chuck table in a Y direction perpendicular to said X-direction;
X-directional position detecting means for detecting the position of said chuck table in said X direction; and
Y-directional position detecting means for detecting the position of said chuck table in said Y direction,
wherein said control means obtains the height of said workpiece at a predetermined position according to detection signals from said X-directional position detecting means and said Y-directional position detecting means, said control means including said memory storing the above-obtained height of said workpiece at said predetermined position.

5. A laser processing machine comprising:
a chuck table having a holding surface for holding a workpiece;
processing laser beam applying means for applying a processing laser beam to said workpiece held on said chuck table;
focal position adjusting means for moving said processing laser beam applying means in a direction perpendicular to said holding surface of said chuck table; and
a measuring device for measuring the height of said workpiece held on said chuck table, said measuring device including
a white light source for emitting white light,
acousto-optic deflecting means for separating said white light emitted from said white light source to produce a flux of diffracted light and for swinging the flux of said diffracted light over a predetermined angular range by applying a voltage, a first pinhole mask configured to pass light having a part of the wavelengths of said diffracted light produced by said acousto-optic deflecting means, a chromatic aberration lens configured to focus the light passed through said first pinhole mask and to apply the focused light to said workpiece held on said chuck table, a beam splitter interposed between said first pinhole mask and said chromatic aberration lens configured to deflect the light reflected from said workpiece, a second pinhole mask configured to pass the reflected light deflected by said beam splitter, a photodetector configured to detect the reflected light passed through said second pinhole mask and to output a photodetection signal corresponding to the intensity of the reflected light detected, and control means for outputting a control signal to said acousto-optic deflecting means and for obtaining the height of said workpiece held on said chuck table according to said photodetection signal input from said photodetector, wherein said control means includes a memory configured to store a first control map setting the relation between the voltage applied to said acousto-optic deflecting means and the wavelength of light passing through said first pinhole mask and a second control map setting the relation between the wavelength of light focused by said chromatic aberration lens and the focal length of said chromatic aberration lens, a value for the voltage applied to said acousto-optic deflecting means corresponding to a peak value for the light intensity detected by said photodetector is obtained by said control means, said above-obtained voltage value is applied to said first control map to thereby obtain the wavelength of light passing through said first pinhole mask, and said above-obtained wavelength of light passing through said first pinhole mask is applied to said second control map to thereby measure the height of said workpiece held on said chuck table.

* * * * *